(Model.)
10 Sheets—Sheet 2.
W. BAYLEY.
AUTOMATIC BINDER.
No. 265,215.  Patented Sept. 26, 1882.
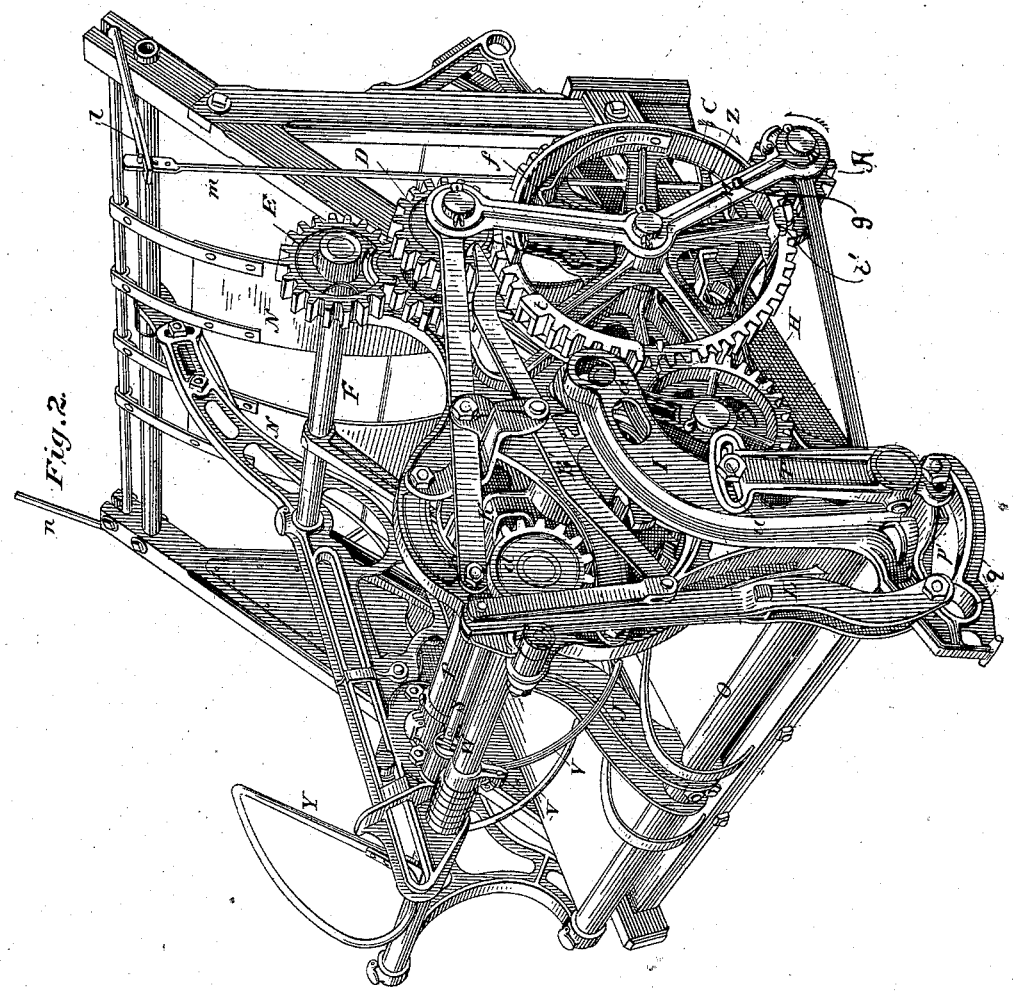

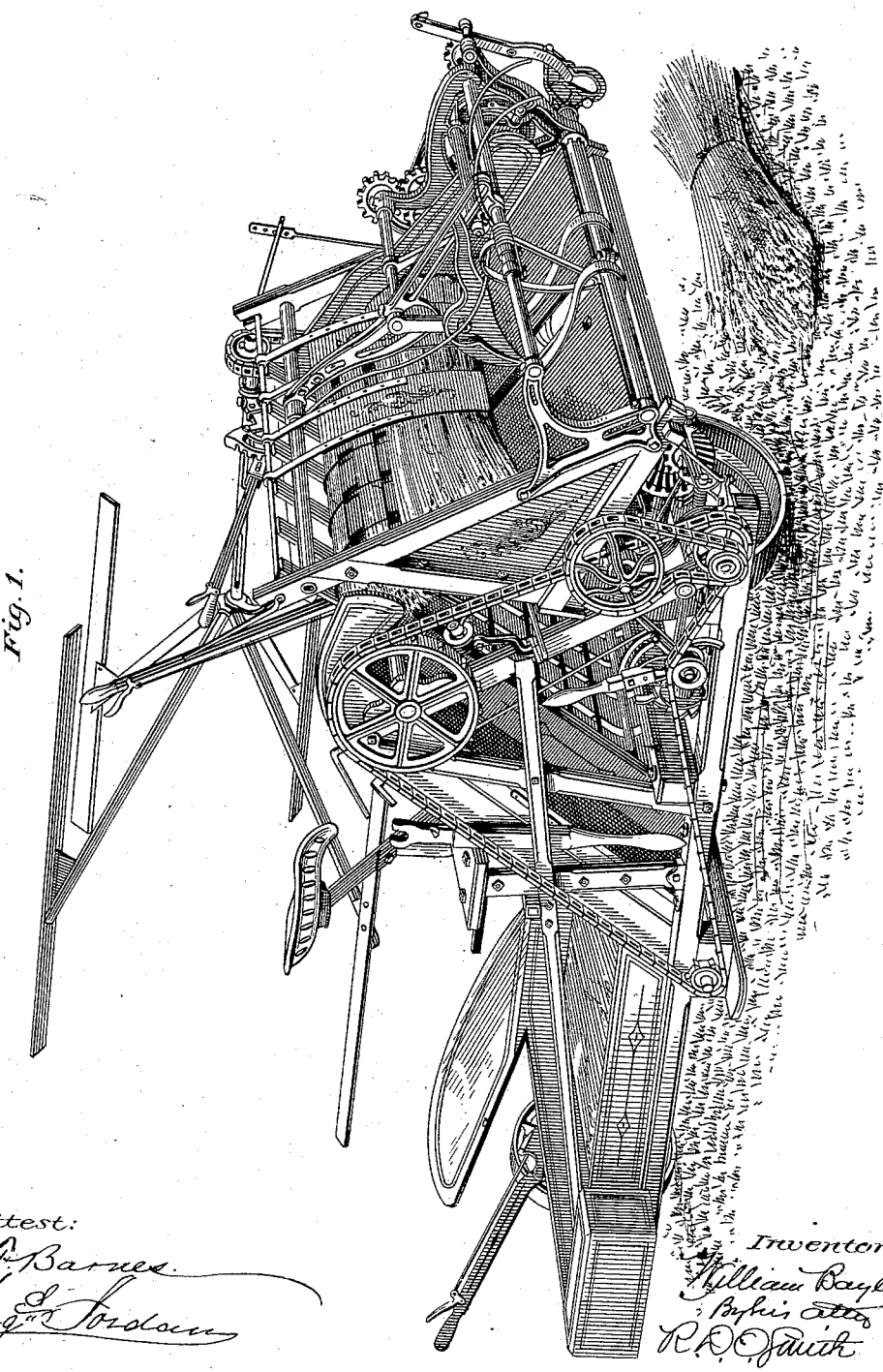

(Model.)

10 Sheets—Sheet 3.

W. BAYLEY.
AUTOMATIC BINDER.

No. 265,215.  Patented Sept. 26, 1882.

Attest:
R. F. Barnes
Aug. E. Jordan

Inventor:
William Bayley
By his atty
R. D. O. Smith (Model.)

W. BAYLEY.
AUTOMATIC BINDER.

No. 265,215.  Patented Sept. 26, 1882.

Attest:
R. F. Barnes
Aug. E. Jordan

Inventor:
William Bayley
By his atty
R. D. O. Smith (Model.)

10 Sheets—Sheet 5.

W. BAYLEY.
AUTOMATIC BINDER.

No. 265,215.

Patented Sept. 26, 1882.

Attest:
R. P. Barnes
Aug. F. Jordan

Inventor:
William Bayley
By his atty
R. D. O. Smith (Model.)
10 Sheets—Sheet 6.
W. BAYLEY.
AUTOMATIC BINDER.
No. 265,215. Patented Sept. 26, 1882.
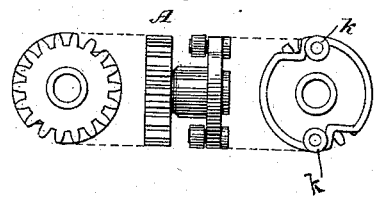
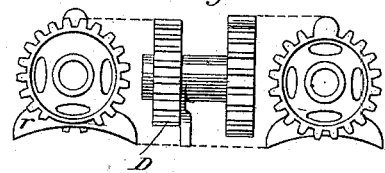
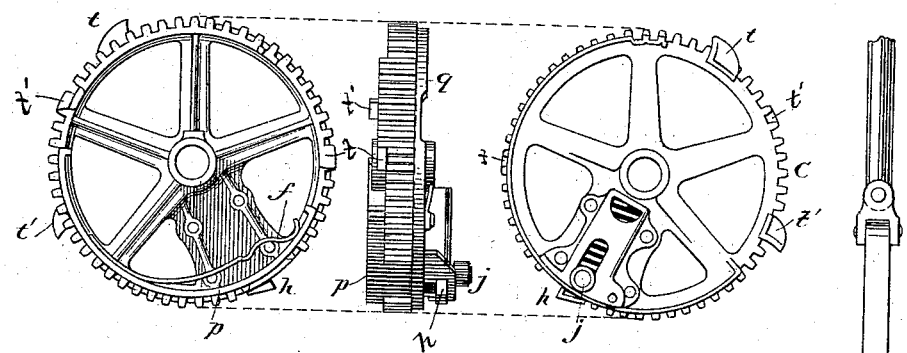
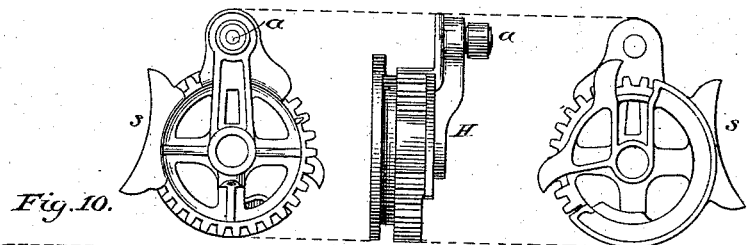
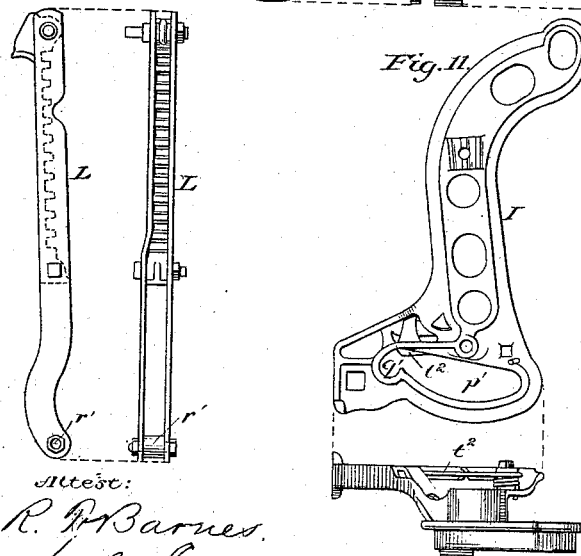
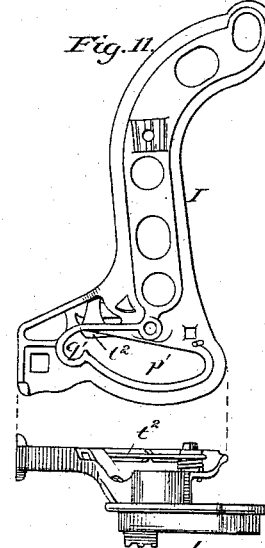
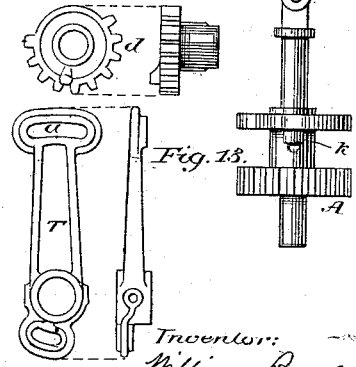
Attest:
R. W. Barnes.
Aug. Jordan.
Inventor:
William Bayley
By his atty
R. O. Smith
N. PETERS, Photo-Lithographer, Washington, D. C.

(Model.)

W. BAYLEY.
AUTOMATIC BINDER.

No. 265,215. Patented Sept. 26, 1882.

10 Sheets—Sheet 7.

Attest:
R. F. Barnes.
Aug. Jordan.

Inventor:
William Bayley,
By his Atty
R. D. O. Smith (Model.)
10 Sheets—Sheet 8.
W. BAYLEY.
AUTOMATIC BINDER.
No. 265,215.  Patented Sept. 26, 1882.
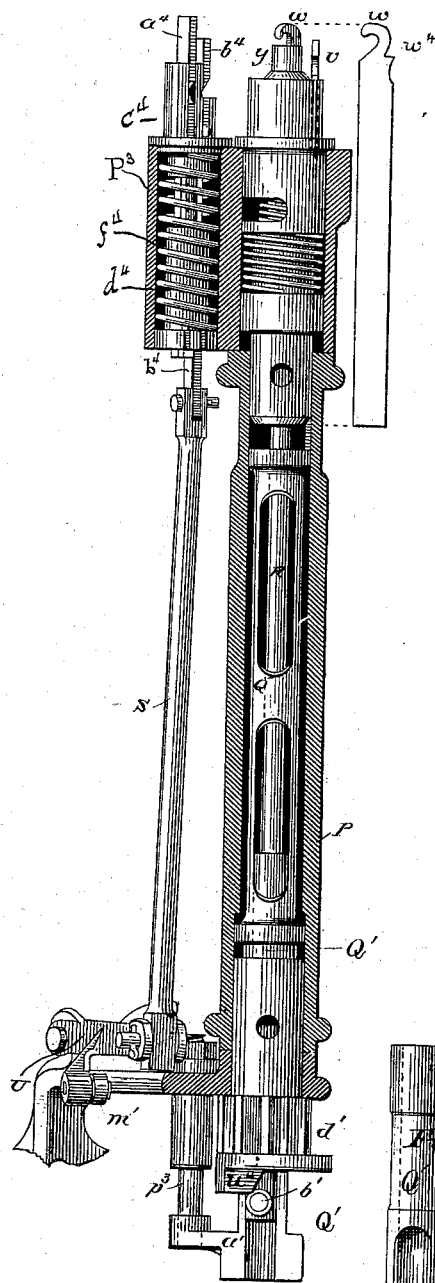
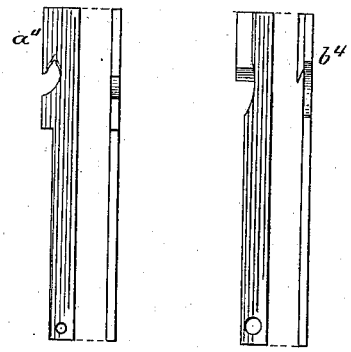
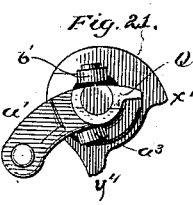
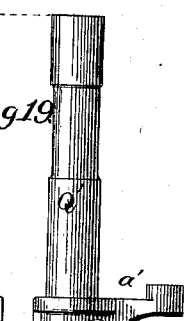
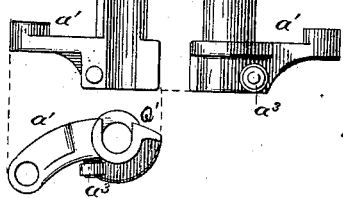
Attest:
R. F. Barnes
Aug. Jordan
Inventor:
William Bayley
By his Atty (Model.)
10 Sheets—Sheet 9.
W. BAYLEY.
AUTOMATIC BINDER.
No. 265,215.  Patented Sept. 26, 1882.
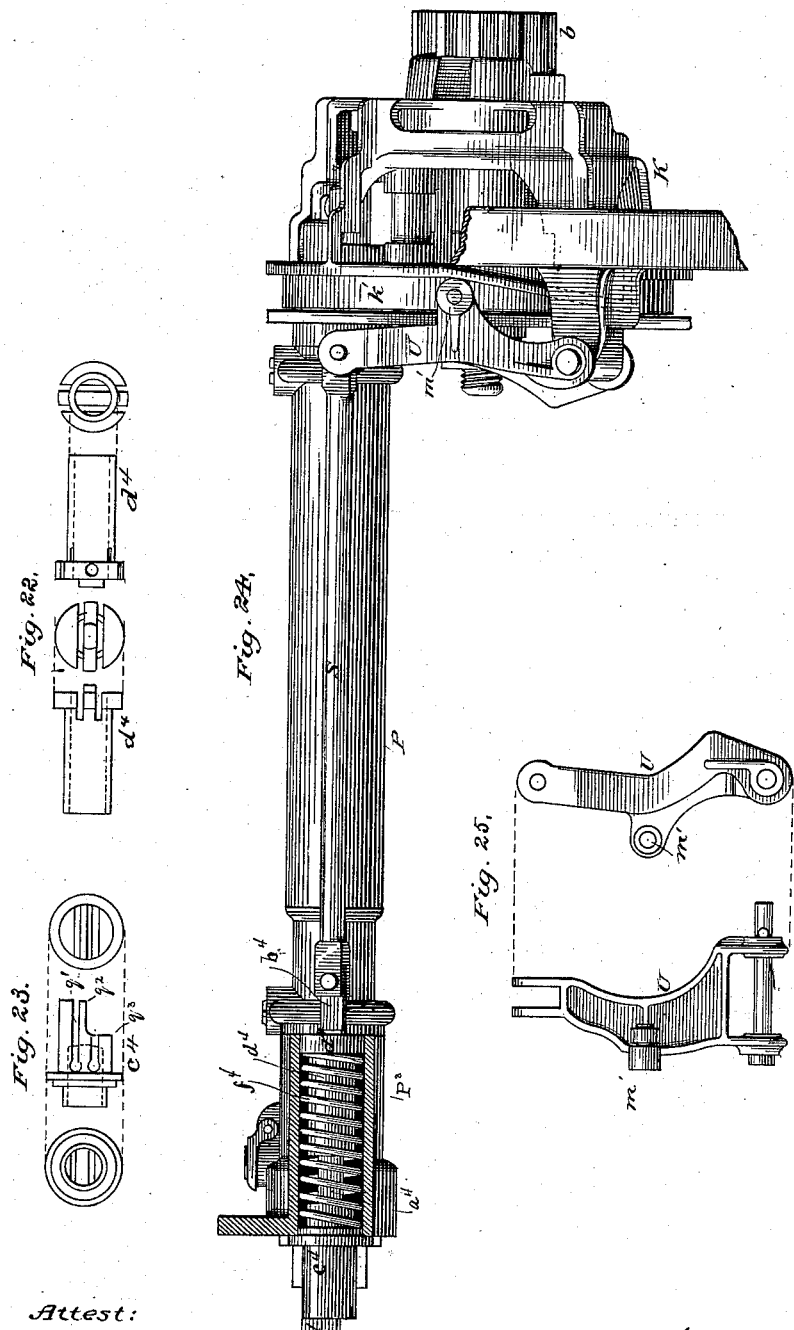

(Model.) 10 Sheets—Sheet 10.

W. BAYLEY.
AUTOMATIC BINDER.

No. 265,215. Patented Sept. 26, 1882.

Attest:
J. C. Turner
Frank A. Fouts.

Inventor:
Wm Bayley
By his atty
R. D. O. Smith

N. PETERS, Photo-Lithographer, Washington, D. C.

UNITED STATES PATENT OFFICE.

WILLIAM BAYLEY, OF SPRINGFIELD, OHIO, ASSIGNOR TO WHITELEY, FASSLER & KELLY, OF SAME PLACE.

AUTOMATIC BINDER.

SPECIFICATION forming part of Letters Patent No. 265,215, dated September 26, 1882.

Application filed October 28, 1880. (Model.)

*To all whom it may concern:*

Be it known that I, WILLIAM BAYLEY, of Springfield, in the county of Clarke and State of Ohio, have invented new and useful Improvements in Automatic Binders; and I do hereby declare that the following is a full and complete description of the same, reference being had to the accompanying drawings, wherein—

Figure 26:
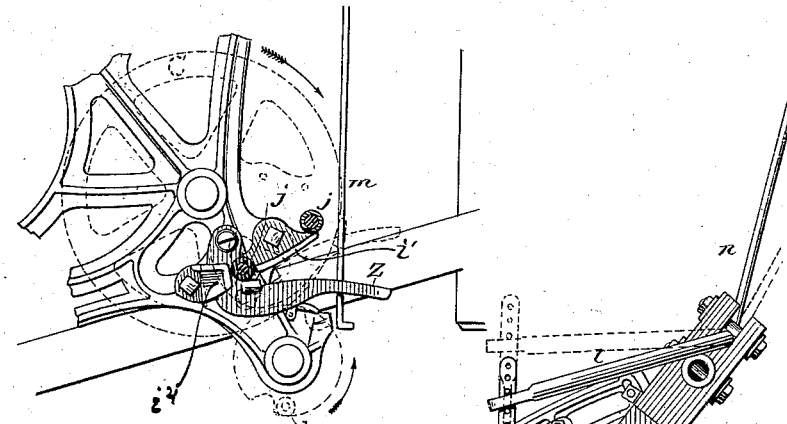
Figure 3:
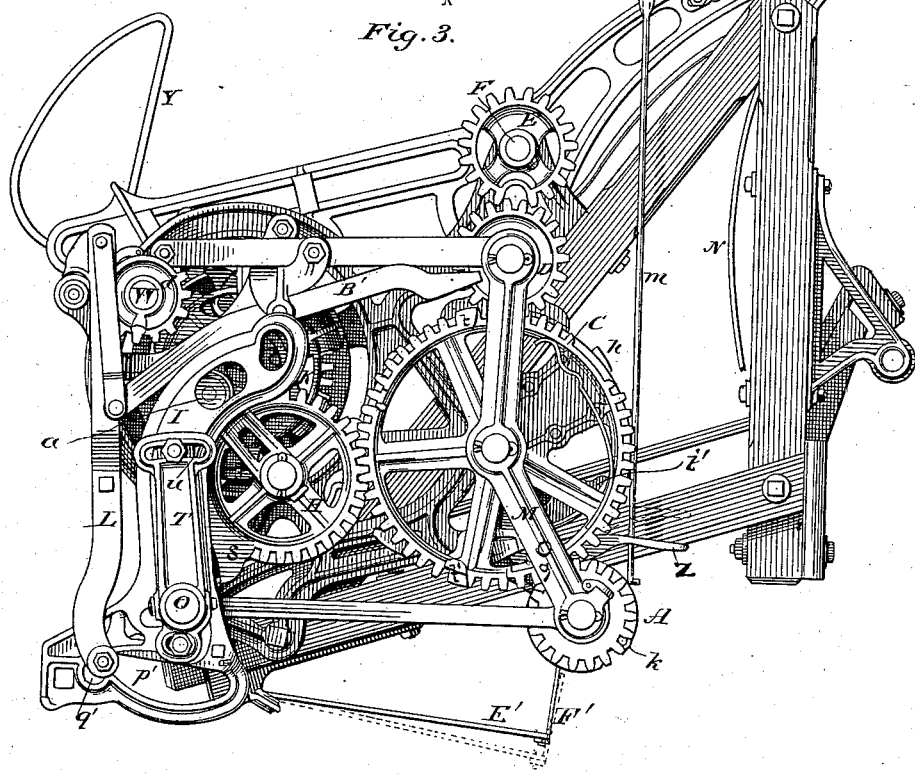
Figure 28:
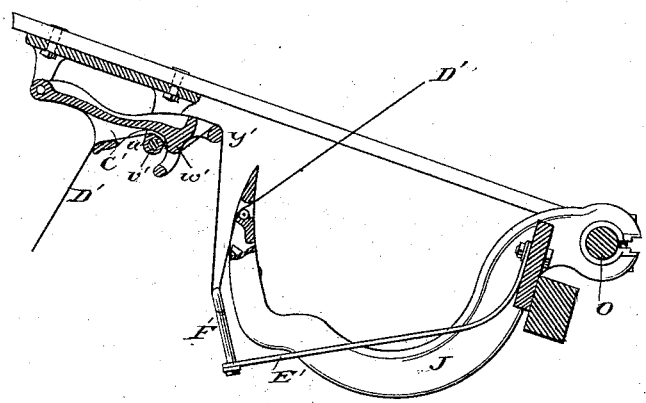
Figure 4:
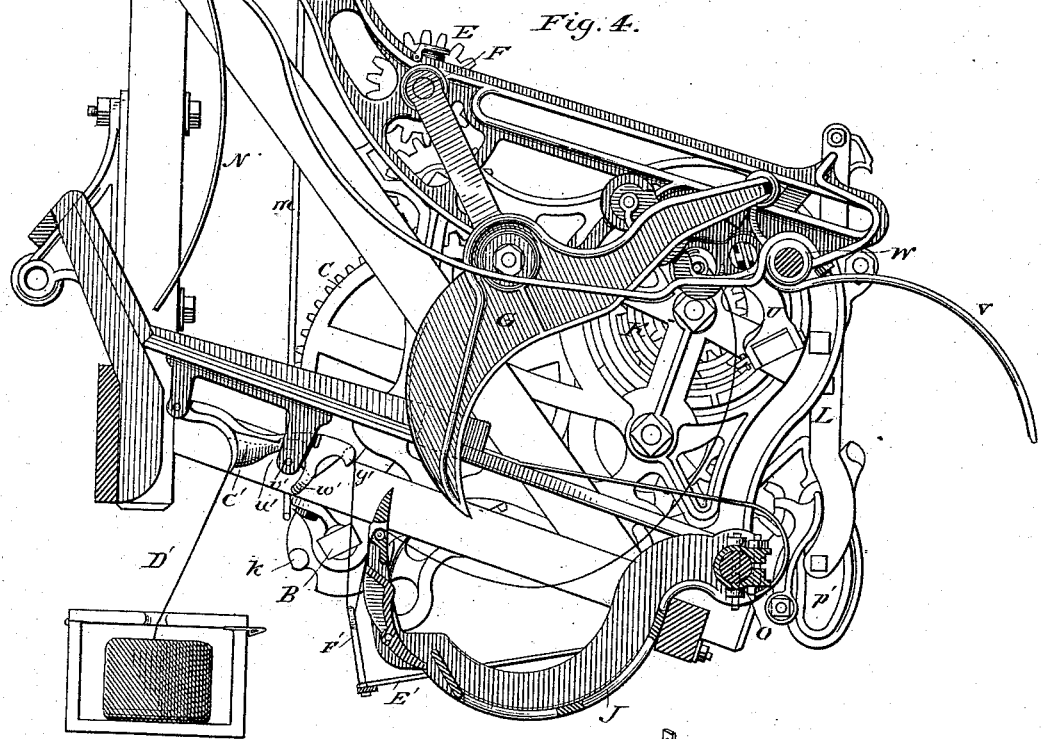
Figure 29:
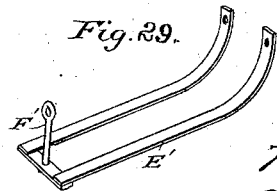
Figure 6:
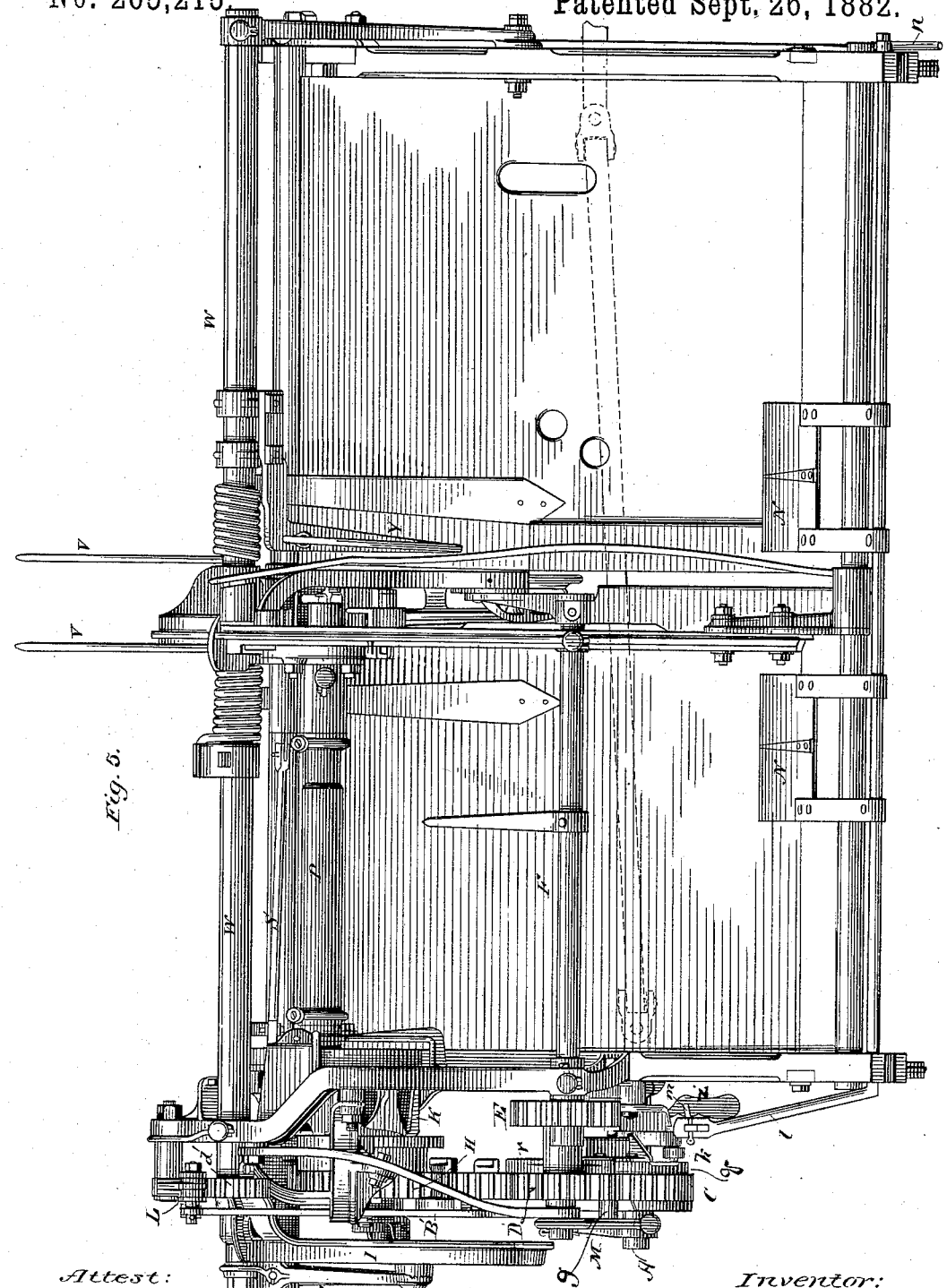
Figure 14:
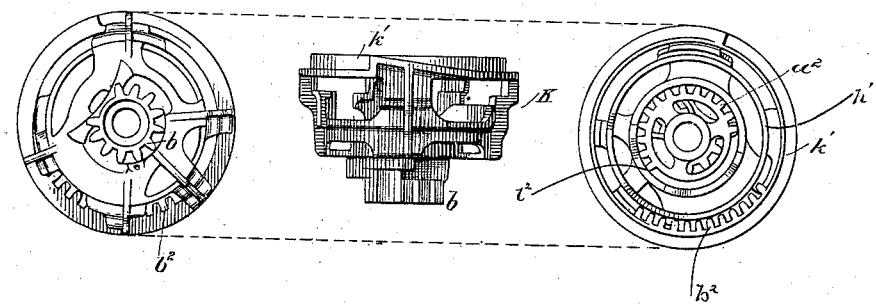
Figure 16:
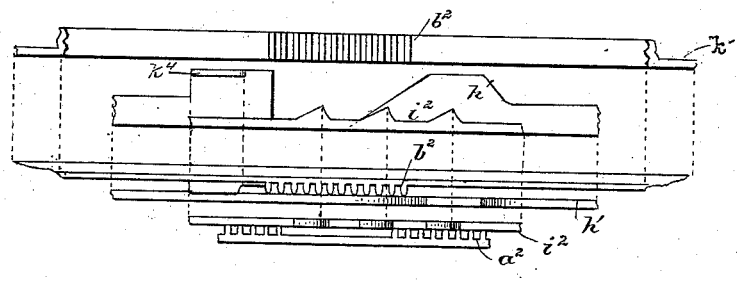
Figure 15:
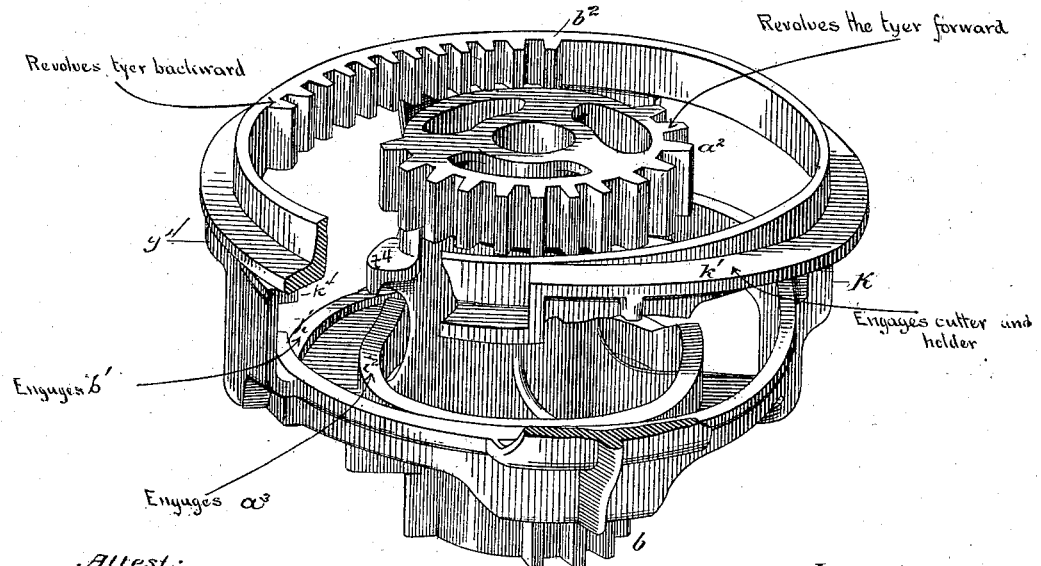
Figure 30:
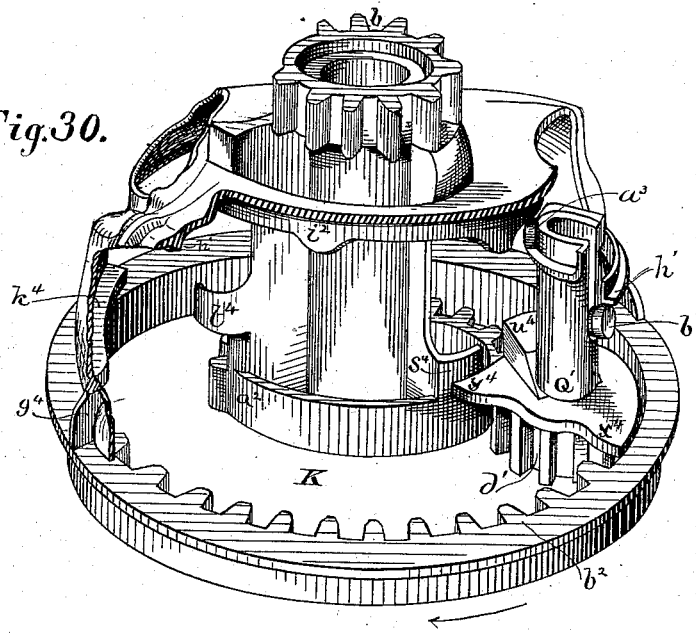
Figure 31:
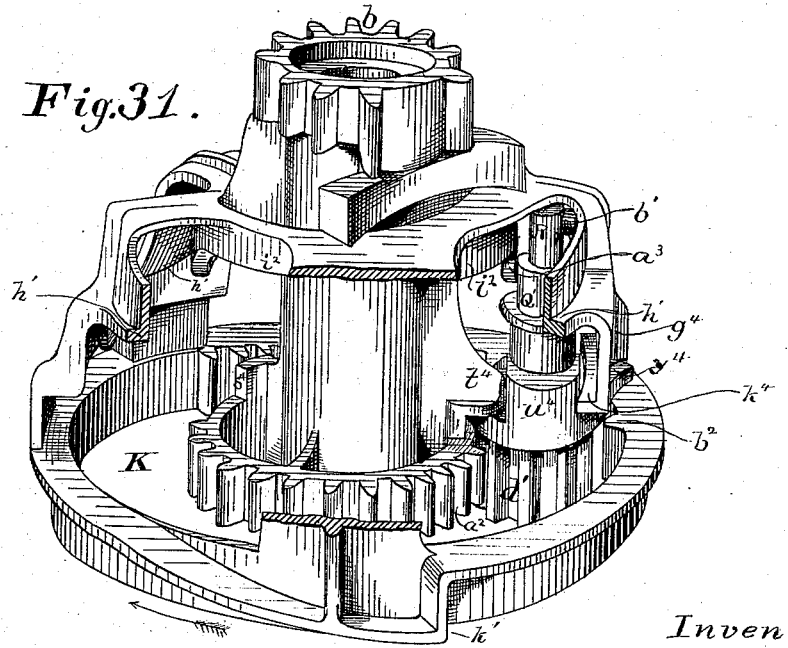

Figure 1 is a perspective of my machine. Fig. 2 is a perspective of the binder from the opposite side. Fig. 3 is an end view of the same. Fig. 4 is a transverse section. Fig. 5 is a plan of the binder. Figs. 6 to 13, inclusive, are details of working parts. Figs. 14, 15, and 16 are details of the tyer-wheel. Fig. 17 is a plan view of the cutter and gripper and mechanism for working the same, portions being in section. Fig. 18 represents the cutter and gripper detached; Fig. 19, details of the looper-piston. Fig. 20 is a plan and elevation of the gripper and cutter piston; Fig. 21, end view of the gripper and cutter piston arm with tyer-wheel pinion; Figs. 22 and 23, details of the gripper and cutter guides. Fig. 24 is a plan of the tyer-wheel and tyer apparatus in position. Fig. 25 is a plan and elevation of the gripper-piston lever; Fig. 26, detail elevation of the latch-stop for the main wheel, showing the stud *j* in two positions; Fig. 27, plan of the tumbling-shaft and connection. Fig. 28 is a longitudinal section of the cord-carrier, take-up, and tension. Fig. 29 is a perspective of the take-up. Fig. 30 is a sectional perspective of the tyer-wheel, with the pinion, &c., which actuate the tying mechanism in initial position. Fig. 31 is a sectional perspective of the same in position at the completion of the forward movement of the tying mechanism.

Those parts of the machine shown and described herein which I have invented, and which form the subject-matter of my claims, are comprised principally in the parts named, as follows: The binding-machine is driven by a tumbling-shaft below the grain-receptacle, taking motion from a main sprocket-wheel at the rear of the machine. The several groups of mechanisms—viz., to separate the gavel, to compress the bundle and place the bands, and to secure the band and discharge the bundle— all take their motions at their several appointed times from one main train-wheel, one revolution of which effects the completed separation, binding, and discharging of one bundle. On the machine-frame, and to act in connection with this train-wheel, I have placed an improved stop and trip, whereby the wheel is arrested and held at the completion of each revolution, provided a sufficient quantity of grain has not already accumulated to form another sheaf. I have also placed on said wheel an improved system of starters and delay slides or tracks. The devices which secure the band and cut the same free from the spool portion are operated by a single rotating crown tyer-wheel. The two tyer-hooks are actuated by an outside and an inside rod sliding back and forth, actuated by cams and retracting-springs. The band cutter and gripper are separate, and move in a measure independently, whereby the gripper catches the band and holds it before the knife acts to sever it. The tension is peculiar in form and mode of action, and acts partly by gravity and partly by reason of the pressure of a light take-up spring upon the band.

For convenience and accuracy I will now briefly describe the general operations of the machine shown in the accompanying drawings, and will afterward particularly describe those devices which form the subject-matter of my claims.

The pinion A receives constant rotation from the prime mover of the harvester by means of a tumbling-shaft or some other suitable and efficient connection. In the present case, as shown in the drawings, said connection is a tumbling-shaft, B, which extends from the journal of said pinion across the machine to a sprocket chain-wheel driven more or less directly from the main bearing and traction-wheel. While the harvester is in action the pinion A is constantly in motion. The main train-wheel C receives motion from said pinion, but is disconnected therefrom by mutilating a part of its face, so that while said pinion may continue to revolve the train-wheel and all the binding mechanism connected therewith may come to rest. The main train-wheel, when it goes into action, first goes into gear with a pinion, D, which in turn actuates a pinion, E, and gives rotation to the shaft F, whereby the divider-arm G is actuated and caused to plunge down through the stream of flowing grain and separate the gavel therefrom, and hold the stream in check while the band-carrier advances and compresses the gavel and while the band-securing devices are in action. When the divider-arm has been thus brought into position the pinion D goes out of gear with the wheel C, and remains so until the band is secured and all the other movements incident upon one entire revolution of the wheel C have been completed. This period of rest of the divider-arm is effected by mutilating the gear-pinion D and providing it with a crescent-plate, which slides on a flange or delay track of the train-wheel, but which at the proper moment encounters a starter, which causes a partial rotation of said pinion and its proper re-engagement with the train-wheel. When, as above described, the divider-arm has separated the gavel, it comes to rest in the stream. The crank-wheel H is also mutilated and provided with a crescent-plate, which slides on another flange of the train-wheel until it also encounters a starter, and is thereby turned into engagement with the train-wheel and goes into action. Its crank $a$ is in engagement with the arm I, and it thereby moves the band carrying and compressing arm J to compress the bundle and place the band in position. This result is accomplished when the pin of the crank $a$ has traversed said arm I from the starting-point to its extremity. The outer end of the arm I is curved with a radius equal to the radius of the curve described by the pin of the crank $a$, and therefore, when said crank-pin in its revolution begins to recede from the extremity of said arm, it simply traverses said curved portion and maintains the arm in position without moving it. This leaves the band-carrier in position while the continuing revolution of the wheel H is actuating the device which secures the band. The band is gripped, severed, and the ends secured together by devices which are actuated by a tyer-wheel, K, driven by the wheel H through a mutilated pinion, $b$, upon said tyer-wheel. Said pinion $b$ is provided with a crescent-plate which slides upon a flange on said wheel H, and at the proper moment said crescent-plate encounters a starter, which causes a partial rotation of said pinion and its engagement with the teeth of wheel H. When movements of the band-securing devices have been sufficient to grip and sever the band and complete the fastening around the sheaf the tyer-wheel K will have completed its revolution and the pin of the crank $a$ will have passed the curved portion of the arm I and begun again to move said arm back to its starting-point. This return movement of the arm I brings into engagement with it the rack-bar L, whereby the pinion $d$ and shaft $w$ are rotated to actuate the discharger, whereby the bundle is ejected from the machine. The train-wheel C may be tripped by hand or automatically by the accumulation of grain in the receptacle. A proper tension and take-up are applied to the band to secure a proper tightness around the bundle.

The driving-pinion A is continually in rotation while the harvester is in action, and therefore the train gear-wheel C is mutilated at one point, so that when opposite said mutilated part the pinion A may rotate freely. The train-wheel is provided with a spring-latch or stop $f$, which engages with a stud, $g$, on the frame or string bar M to arrest and hold the train-wheel at rest when the gear A has reached the mutilated part described, and prevent the wheel C from moving until the pinion A has again been brought into mesh at the proper point. There is also on said train-wheel a radial latch-bolt, $h$, which has a spring to throw it outward, and a projecting stud, $j$, whereby it may be drawn inward. There is upon the frame a swinging stop-plate, Z, which, when it is down in its normal position, is directly in the path of the stud $j$, so that after the bolt $h$ has been pushed inward by the contact of the stud $j$ with the cam $i'$ the stop-plate Z will cause said bolt $h$ to be held inward toward the center of the wheel C and prevent its coming in contact with the stud $k$ on the revolving pinion A, and stud $j$ now abutting against the stop $i^4$, said wheel C will thereby be held motionless. Stop-plate Z may, however, be withdrawn from the path of the stud $j$, and the bolt $h$ will then protrude and be engaged by a stud, $k$, or other suitable device on the shaft of pinion A as it revolves, and the wheel C will be caused to rotate far enough and at the proper moment to engage the pinion A, and thereby start the binding mechanism.

The stop-plate Z may be moved automatically by the apron N when the same has been raised by the accumulation of grain sufficient for a large or small bundle, whichever may be desired, or it may be operated at will by the attendant. Both methods are provided for in my machine. The shaft of the apron N has at its end a lever, $l$, which is connected with the stop-plate Z by a rod, $m$, adjustable as to length, so that the stop shall be withdrawn by a greater or less lift of the apron, and the sizing of the bundle is thereby effected. At the opposite end of the apron-shaft there is also a hand-lever, $n$, whereby the attendant can at will raise said stop and release the bolt $h$.

If the grain is very heavy, the elevator may feed it into the receptacle in such quantity that at the completion of each revolution of the wheel C enough for a sheaf will have already been received in the receptacle. In that event the stop-plate Z will have been withdrawn automatically before the arrival of the stud $j$, and the stud, after riding over the cam $i'$, will spring out to its normal position, and the mutilated part of gear C will be bridged over by the engagement of the bolt $h$ and stud $k$, as described.

The wheel C is provided with laterally-projecting flanges $p$ $q$ around its periphery, and the wheels D and H, which mesh directly with the wheel C, are each mutilated gears, and provided with crescent-plates $s$ $r$, the curve of the faces whereof corresponds in radius with the said flanges $q$ $p$, so that so long as one of said crescent-plates is in contact with one of said flanges its wheel cannot move on its axis. The flanges $p$ $q$ are not, however, continuous. At the proper point each of said flanges is broken away, and opposite each end of said flanges, with a short intervening space, there is a projecting starter, $t$ $t'$, against which the point of the crescent-plates will strike and be turned down through the intervals or notches in the flange, and the wheels will be thereby caused to mesh with the gear on the wheel C. This effect takes place first as to the pinion D, whereby the shaft F and divider-arm are actuated, and subsequently as to the wheel H, whereby the arm I and shaft O, which carries the band-carrier and compressor J and the tyer-wheel K, are actuated. The object of having starters at each end of the break in flanges $p$ $q$ is to prevent the wheels D H from being put into mesh wrongly. The wheel K and said wheel H are brought into mesh by a similar system of flanges and starters as the wheel C is with either D or H, only the flange and starters are set off at one side to make room for the passage of the starters $t$ $t'$ on the wheel C.

The band-securing devices consist of a gripping and looping hook, $v$, a knotting-hook, $w$, and a neck, $y$, which have combined rotary and reciprocating motions; but these parts not having been invented by me, and being already known in the art, are not herein particularly described. Nevertheless I have very materially improved the operative mechanism of said band-securing device by the application of the tyer-wheel K with continuous cam-tracks for pushing the hooks $v$ and $w$ out or allowing them to recede at the proper time during the revolution of the wheel K, and also allowing the tying device to remain at rest at the proper time during the revolution of the wheel K. The hooks $v$ $w$ are permitted to be operated while the revolving part of the tying device is at rest. The rotary motion of the band-securing device is derived from the rotation of the barrel or hollow shaft P, and the hooks receive the separate reciprocations by means of the hollow rod Q and the solid piston or rod R, and the several motions of these parts, together with the movement of the rod S which actuates the gripper $a^4$ and the cutter, are all derived from appropriate cam-tracks, which form parts of the tyer-wheel K. The outer end of the tubular rod Q bears against a sleeve, Q', which is provided with a laterally-projecting arm, $a'$, which slides on a proper guide—such as the pin $p^3$—and is thereby restrained from revolving with the barrel P, and the stud $b'$, which is set in the side of the rod R, slides in a slot made in the tubular sleeve Q', and is thereby prevented from rotation. The roller $b^5$ on rod R is a friction-roller traversing the edge of the slot in the sleeve Q' to relieve friction on said rod as it moves back and forth. For convenience in manufacture, and to prevent wear, the rods Q and R are each made in two parts, the outer ends being turned and fitted as shown, and the inner parts being rough iron, only fitted at the ends. The barrel P has at its extremity a pinion, $d'$, carrying a flange with projecting stops $x^4$ $y^4$, which at the proper moment engage with stops attached to the tyer-wheel K, whereby said pinion $d'$ is arrested and held in proper position for engagement with the toothed segments on the tyer-wheel.

Before describing the structure and function of the tyer-wheel K it will be necessary to describe the movements of the several parts affected by it. When the knotting device is in normal position the projection $y^4$ rests upon a stop, $s^4$, projecting longitudinally from the segment $a^2$, having been left so by the segment $b^2$ when it went out of mesh with the side pinion. At this moment the teeth of the pinion $d'$ are in position to mesh with the segment $a^2$ at the commencement of the initial movement. Therefore when the rotation of the wheel K commences $a^2$ engages with $d'$ and revolves it forward, and at the moment before disengagement the stud $t^4$ on the wheel K engages with the shouldered projection $u^4$ on the sleeve of the pinion $d'$, and thereby causes said pinion to move out of engagement with the segment $b^2$. The projection $x^4$ passes below the stud $t^4$, between it and the pinion $a^2$, and the shouldered projection $u^4$ slides between said stud $t^4$ and the flange $k^4$. The pinion is thereby prevented from rotating too far, and said pinion then comes to rest in proper position to engage with segment $b^2$ and be thereby rotated backward to the place of beginning. While in this position and interval of rest the stop $y^4$ extends outward below the flange $k^4$ and above the rim of the wheel K and directly in the path of the starting arm $g^4$. The continuous movement of the wheel K causes the arm $g^4$ to engage said stop $y^4$ and cause the backward rotation of the pinion $d'$ to commence and immediately engage with the segment $b^2$. The first movement of the tyer-wheel K brings the cam-track $i^2$ in contact with the roll $a^3$ on the sleeve Q' and pushes it forward, thereby causing the gripping and looping hook $v$ to advance and get well open before any rotation of the tying device commences, and as the tyer-wheel continues to revolve the pinion $d'$ is thrown into mesh with the gear-segment $a^2$ on the wheel K, and the tying device is caused to revolve forward—that is, in the direction of the passage of the grain. This occurs immediately after the band-carrier J has laid the band in position across the neck $y'$. Immediately upon the commencement of the rotation of the barrel P the hook $v$, which is now projecting, is rotated forward until it covers the band, and when the rotary movement has progressed sufficiently far to insure the engagement of the band by this hook $v$ the latter is suddenly released by the projection on the cam-track $i^2$ on the wheel K and retracted by its spring, and the band is thereby gripped. Simultaneously with this movement the hook $w$ is allowed to recede until the shoulder $w^4$ on the back of it is even with the face of the tying device, and it is then in position for its next movement. When the band has been gripped by the hook $v$ the rod S is thrust forward and the cord-gripper $a^4$ and cutter $b^4$ are projected. The old end of the band is thereby released, and the new end of the band drops into the notch of the gripper, which a moment afterward—when the rotation of the tying device has progressed far enough to make both ends of the band of equal length—is also released and permitted to grip the cord. The cutter immediately follows and severs the sheaf-band from the band material by the force of its momentum acquired from the spring $f^4$. The sheaf-band is then held entirely by the gripper and looper hook $v$. The continued rotation of the barrel P winds the band around the neck $y$ and carries the ends beneath the part which extends around the sheaf. When this has been done the neck $y$ is withdrawn into its sheath, leaving the hook $w$ exposed, and the ends of the band, being still carried around by the gripper $v$, pass across the end of the neck $y$ and into the hook $w$. The forward movement of the tying device has now been completed, and the stud $t^4$ has engaged the shouldered projection $u^4$ on the pinion $d'$, and said pinion has come to rest with said shouldered projection between said stud $t^4$ and the flange $k^4$ on wheel K. By this means the tying device is held at rest, while the hook $w$ is released and permitted to recede and draw said ends down into its cell. The pinion $d'$ is now thrown into mesh with the gear $b^2$ on the wheel K, and its backward rotation commences, when the gripper $v$ is again projected to release the ends held thereby during the forward motion of the tyer and almost immediately retracted. The duty of holding the band ends is now transferred to the knotting-hook $w$. The recession of the hook $w$ and the backward rotation of the tying device cause the loop around the neck $y$ to slip off said neck at one side, while said neck is again advanced from its sheath to permit the loop to be fully discharged; and, finally, the hook $w$ is restored to its normal position, which releases the knot. As an extra precaution against the hook $v$ catching the ends that it has just released, it is allowed to open again just as the knot is being dropped by the hook $w$, so as to let all go together. This is intended to permit it to get away from the ends which it has just released, to prevent gripping them again, and so spoiling the knot. At the completion of the backward rotation of the pinion $d'$ the stop $y^4$ again rests on the stop $s^4$. The cylindrical case $P^3$ is placed by the side of and parallel with the knotter-case to receive the gripper $a^4$ and cutter $b^4$. Said gripper and cutter are respectively formed of flat bars of suitable metal, and at their outer ends they pass through separate slots in the head $C^4$, which is fitted to the outer end of the case $P^3$. Said head is provided on its outer end with projecting plates or abutments $q'$, $q^2$, and $q^3$, of which the first and second form a gripping-seat for the gripper $a^4$, and the third forms a shear-plate for the cutter $b^4$. At the opposite end of case $P^3$ there is a slide, $d^4$, which is also provided with slots for the gripper and cutter, the former of which is secured to said slide by a pin, and the latter passes freely through said slide and is coupled to the push-bar S. A spring, $f^4$, separates the slide $d^4$ from the head $C^4$ and forces them asunder, and thereby the gripper is drawn back to clamp the band-cord upon its seat. In operation, when the pusher-rod S is pushed up the cutter is also moved independently of the gripper until the end of said pusher-rod encounters the slide $d^4$, and thereafter the gripper is moved up also. The effect of this is that the cutter has a longer range of motion than the gripper, and whereas, when released, the spring $f^4$ immediately closes the gripper upon its seat, the cutter is only moved part way home by said spring, and advances over the remainder of the distance by its momentum acquired from the force of the spring while acting on the gripper and cutter together, and the cord is severed. All these parts have now been restored to their initial position, knotter-hook $w$ projecting and gripper and looper hook $v$ retracted, and the tyer-wheel K, having completed one revolution, comes to rest.

The several movements above described are simply a continuous rotary movement of one part and a series of relatively-timed reciprocations of associated parts until the tying of the knot is completed and the retrograde rotation of the devices to the initial position. These tracks or cams are irregular in shape and present a different form when the tying device is being moved forward from when it is being moved backward. This form of tyer-wheel also has another advantage: The tying device, being driven forward by the segment $a^2$, takes more of the movement of the tyer-wheel K than the backward movement which is given by the segment $b^2$. This gives a slow and powerful movement forward, which insures a gentler handling of the cord and more positiveness in tying, while the quicker retrograde movement drops the knot as quickly as possible after it has been completed.

The wheel K rotates always in one direction, but with proper periods of rest, the forward and retrograde rotation of the band-securing devices being effected by the segments on the wheel K with their associate tracks or delays. In Fig. 14 the tyer-wheel K is shown in bottom and top plan and in elevation, and in Fig. 16 the several cam-tracks are developed on a plane surface, so that their forms and relations may be more easily distinguished.

The segment-gears $a^2$ $b^2$ give to the barrel P its forward and backward rotations, respectively.

The cam-track $i^2$, by engagement with roller-stud $a^3$, actuates the gripper and looper $v$, and the cam-track $h'$, by engagement with the roller-stud $b'$, actuates the knotting-hook $w$. Besides these, there is an exterior cam-track, $k'$, on the wheel K, which at the proper moment engages the stud $m'$ on the swinging arm U, and thereby causes the rod S to operate the gripper and the cutter to seize the band, sever it, and hold the new end.

The arm I is mounted loosely upon the shaft O and is locked thereto by means of a supplemental arm, T, which is keyed fast to said shaft and adjustably locked to the arm I by means of a slot, $u$, and clamping-bolt at one end, with radially-serrated contact or locking surfaces at the point of contact between said arms I and T. The arm I, being loosely fitted upon the shaft O, is liable to a slight motion upon the clamping-bolt in the slot $u$ as a fulcrum, and this movement may possibly amount to a quantity sufficient to disturb the adjustment. I have therefore provided the arm T at its other extremity with a second slot, similar to $u$, and by means of a second clamp-bolt in said slot the arms I and T are firmly locked together and the arm I held in position independent of the shaft O. By this means it is easy to adjust the throw of the band-carrier to the band-securing mechanism after the machine has been completed and set up.

The band-carrier J, in compressing the bundle, acts against the elastic compressors V, which are mounted upon the shaft W. These compressors V are sustained in position while the band is being placed and secured around the bundle, and then, by the partial rotation of the shaft W, they recede to permit the bundle to be discharged, and the discharger Y, which is also carried by the same shaft, comes down behind the bundle as the compressors V retreat and forces the bundle out of the machine if it clings to the mechanism or to the gavel next in succession. The shaft W is maintained in position by the rack-bar L, which meshes with the pinion $d$, and at the proper moment is actuated through said rack-bar and its engagement with the arm I. The rack-bar L has an endwise movement between guides and in mesh with the pinion I. At its lower end said rack-bar engages with the short arm of the lever I, which has a slot, $p'$, for the purpose of allowing a latitude and variance of motion between said arm and rack-bar. The slot $p'$ has at one end a recess or cell, $q'$, into which the coupling-pin $r'$ of the rack-bar L drops when the arm I has been raised to its highest extension, and when said arm I begins to descend again the engagement of pin $r'$ in the cell $q'$ causes the rack-bar L to be carried up with the other end of the arm until said coupling-pin is forced out of said cell, when it is again free to descend to its initial position; and to prevent the escape of the pin $r'$ from said cell before the proper time, and to throw it into the cell at the proper time, I place a spring-latch, $t^2$, on the arm I, in front of said cell. This latch yields with sufficient readiness to the pressure of the pin $r'$ when it is brought with proper directness thereon, as it is when passing into the cell and when the proper time for escape therefrom has arrived. The rack-bar is positively maintained in position when at rest by the lever B', which is pivoted to the stationary frame, and at one end joined to said rack-bar by a connecting-rod or otherwise, while the other end rests upon a cam-flange on the train-wheel C, and the rack-bar is thereby kept down and the compressors V in position during the time the divider G is bringing the grain in, and when the bundle is being compressed and bound it rises above the track, and when the band has been secured the end of the cam on wheel C is reached and the lever B' is released, to move down when the rack ascends. This occurs at the time when the retrograde movement of the arm I commences and the rack-bar is engaged with the cell $q'$. After the discharge of the bundle and the escape of the pin $r'$ from the cell $q'$ the re-engagement of the lever B' with the cam on wheel C forces the rack-bar down again to its initial position.

The tension is constructed to combine gravity, compression, and change of direction, to increase friction during the time of taking up or recovering the surplus band and to obviate almost entirely these retarding forces during the time the band-carrier is advancing and drawing additional band from the spool or ball. It is well understood that the additional band material drawn out each time is equal to the quantity consumed by the bundle, but that at each operation the band-carrier is required to handle a quantity larger than is required to bind the bundle, and that it is desirable to obviate resistance while paying out and to secure the greatest attainable resistance toward the spool or ball while taking back the surplus or slack. The tension consists of a tube, C', hinged at one end to a proper part of the binder-frame, and having a transverse notch, $u'$, which falls over the stationary cross-bar, $v'$. It is also provided at its free end with a downwardly-projecting ledge, $w'$, and in front of said ledge, and transverse to the tube, there is a loop, $y'$. The cord D' for the band enters the tube C' at its rear end, and passes above the cross-bar $v'$, thence under the ledge $w'$, and upward through the loop $y'$. When the band-carrier is drawing cord from the spool or ball the draft from the loop $y'$ will be upward, and the tube C' will be lifted from the cross-bar, and the cord will render freely through without much resistance; but when the take-up E' begins to take up the slack it draws the cord down over the loop $y'$ and pulls the tube C' down upon the cross-bar $v'$, so that the cord is pinched between said cross-bar $v'$ and top of the tube. At the same time it is required to make short turns under the ledge $w'$ and through the loop $y'$, and the friction is thereby greatly increased and the cord will break before it will be pulled through. By these means a weak take-up spring will produce a strong tension, and the tension on the cord laid around the bundle will be equal to the strength of the take-up. The tension will be almost entirely relieved at the time when freedom of movement is most required.

The take-up E' is made with two slender springs joined at their free ends to a stirrup, F', through which the cord D' is passed. This mode of construction obviates the torsion which is liable to affect a single spring.

Having thus described my invention, what I claim as new is—

1. In an automatic grain-binder, a train-wheel, C, mutilated and provided with a bolt, $h$, impelled by a spring, combined with a cam and a swinging stop-plate, Z, on the frame, whereby said bolt $h$ may be pushed in and so held or released, and when pushed in said wheel C will be absolutely stopped and prevented from engaging with its driver.

2. In an automatic grain-binder, a train-wheel, C, mutilated and provided with a spring-impelled bolt, $h$, combined with a stationary cam, $i'$, to push said bolt inward, a swinging stop-plate, Z, pivoted to the frame, and a pinion, A, carrying a stud or roller, $k$, to engage said bolt when it shall be liberated to cause the wheel C to engage with said pinion.

3. In an automatic grain-binder, a shaft provided with a pinion, A, carrying one or more rollers or studs, $k$, in combination with the mutilated train-wheel C and its spring-pressed bolt $h$, all arranged so that when the bolt $h$ has been released and is forced outward into the path of the stud $k$ the mutilation will be thereby bridged over and the wheel C will be moved.

4. A starting mechanism composed of the pinion A, with its stud $k$, and the train-wheel C, with its bolt $h$, and a stop plate, Z, all arranged to work as described, and combined with an apron, N, and connection $m$, rigid or adjustable.

5. An apron, N, combined with a pivoted swinging stop-plate, Z, and the cam $i'$ on the frame, and the bolt $h$ on the main train-wheel, whereby when the apron N is raised said latch will be withdrawn to release said bolt $h$ and bridge the mutilation in the wheel C.

6. A crank-wheel, $h$ H, which gives motion to the shaft O by means of the curved and grooved arm I, or its equivalent, combined with a tyer-wheel, K, carrying a pinion, $b$, which is mutilated and governed by the wheel H, all arranged so that the pinion $b$ is thrown into mesh with the wheel H, and the tyer-wheel K goes through its principal movements while the shaft O is nearly or entirely at rest.

7. A hollow wheel, K, provided with suitable segments and slides, as described, to give the desired motion and rest to the wheel $d'$, and having also suitable cam-tracks to give reciprocating motion to the gripper and looper hook and knotter-hook of a tying device and a cord cutting and gripping device, as set forth.

8. In an automatic grain-binder, a wheel, K, provided with segments $a^2 b^2$ to give the required motion to the pinion $d'$, and with cam-tracks $k'$, $h'$, and $i^2$, arranged in tiers, each cam-track controlling a part of the knotting mechanism.

9. In an automatic grain-binder, a pinion, $d'$, with its projections $x^4$ and $y^4$ on its outer or free end, the lip $w^4$, combined with the segment $b^2$, pinion $a^2$, with its stop $s^4$, and stud $t^4$, as set forth.

10. In an automatic binder, the arm I, with the slot P', and cell or recess $q'$, combined with the latch $t^2$ and the rack-bar L and segment $d$, whereby the compressor is operated, as set forth.

11. A pusher, Q, and a pusher, R, arranged to reciprocate but restrained from rotation, the former by means of the arm $a'$ and pin $p^3$ and the latter by means of the slot in the sleeve Q' and the roller $b^5$, or their equivalents, the pusher R and the sleeve Q' each provided with a projecting stud, which is operated upon by the proper cam-tracks on the wheel K to reciprocate the pushers.

12. A barrel, P, having at one extremity the knotter and at the other extremity the pinion $d'$, combined with the non-rotating pushers Q and R within said barrel, the pinion arranged to give rotation to the knotter, and the pushers arranged to give reciprocation to its gripper and looper hook and knotting-hook at the desired time during the revolution of the wheel K.

13. A tyer-wheel, K, having segments and slides for controlling the pinion $d'$ and cam-tracks for controlling the pushers Q and R and the lever U, and having a pinion, $b$, which is mutilated and provided with a crescent-plate to allow of its being controlled by another wheel.

14. A cord-gripper bar, $a^4$, which secures and holds the ball end of the twine, combined with a rod, S, and bar $b^4$, carrying a knife which severs the twine, engaged with and operating said gripper, but so arranged that the cutting-edge of the knife has motion independent of the gripper-bar.

15. The gripper-bar $a^4$ and the slide $d^4$, coupled therewith, the retracting-spring $f^4$ and the pusher-rod S, combined with the cutter-bar $b^4$, coupled at its back end with said pusher-rod, whereby said pusher-rod, on its advance, first moves the knife beyond the notch in the gripper-bar, then comes in contact with the slide $d^4$, then advances the knife and gripper together until the pusher-rod is released from cam $k'$, when the spring, acting against the slide $d^4$, closes the gripper, and the knife and its connection following and gathering force from the spring $f^4$, so that when the gripper has closed upon the string and its motion has been arrested the knife continues to move and severs the string.

16. A rotary knotter, combined with a gripper and looper, $v$, and actuating mechanism, so arranged that the said gripper is projected so as to receive the cord before the tyer commences to rotate, is shortly afterward retracted to grip and hold the same, and when the loop has been completed and the retrograde movement commences said gripper is projected to drop the cord, and retracted, and then again projected and retracted just as the knotting-hook $w$ is releasing the knot.

17. The reciprocating rack-bar L and segment $d$ in mesh therewith, and the operative mechanism whereby said rack is actuated, combined with the lever B', pivoted to the frame, and linked at one end to said rack-bar and at its opposite end adapted to engage with the flange $p$ on the train-wheel to force said rack-bar back to its initial position, as set forth.

18. In an automatic grain-binder, the arm I, with the slot $p'$ and cell or recess $q'$, combined with the latch $t^2$.

19. The tension C', consisting of a tube pivoted at one end and at the opposite end provided with a transverse notch, $u'$, a ledge, $w'$, and a loop, $y'$, combined with the cross-bar $v'$.

20. The elastic take-up E', composed of two elastic strips, secured at their bases to the frame of the machine and at their free ends joined to the stirrup.

WILLIAM BAYLEY.

Witnesses:
HENRY MILLWARD,
E. H. BARNES.